(12) United States Patent
Mader

(10) Patent No.: US 7,525,416 B2
(45) Date of Patent: Apr. 28, 2009

(54) DEVICE, VEHICLE AND METHOD FOR DETECTING A COLLISION OF AN OBJECT ON A COLLISION LOCATION DETECTION REGION OF A VEHICLE

(75) Inventor: Gerhard Mader, Thalmassing (DE)

(73) Assignee: Siemens Aktiengesellschaft, Munich (DE)

( * ) Notice: Subject to any disclaimer, the term of this patent is extended or adjusted under 35 U.S.C. 154(b) by 334 days.

(21) Appl. No.: 11/579,788

(22) PCT Filed: Apr. 26, 2005

(86) PCT No.: PCT/EP2005/051852

§ 371 (c)(1),
(2), (4) Date: Nov. 7, 2006

(87) PCT Pub. No.: WO2005/110819

PCT Pub. Date: Nov. 24, 2005

(65) Prior Publication Data

US 2008/0238641 A1    Oct. 2, 2008

(30) Foreign Application Priority Data

May 7, 2004 (DE) .................... 10 2004 022 591

(51) Int. Cl.
*B60Q 1/00* (2006.01)
*B60K 28/10* (2006.01)
*B60T 7/22* (2006.01)
*B60T 7/12* (2006.01)

(52) U.S. Cl. ..................... 340/436; 180/274

(58) Field of Classification Search ............ 340/436, 340/437; 180/268, 271, 274; 701/300–302
See application file for complete search history.

(56) References Cited

U.S. PATENT DOCUMENTS

| | | | | |
|---|---|---|---|---|
| 5,748,075 A | * | 5/1998 | Dirmeyer et al. | 340/436 |
| 6,561,301 B1 | * | 5/2003 | Hattori et al. | 180/274 |
| 6,744,354 B2 | | 6/2004 | Stephan et al. | 340/436 |
| 6,885,966 B1 | * | 4/2005 | Tyroller et al. | 702/138 |
| 7,036,621 B2 | * | 5/2006 | Takafuji et al. | 180/274 |
| 2005/0116817 A1 | * | 6/2005 | Mattes et al. | 340/436 |

FOREIGN PATENT DOCUMENTS

| DE | 196 02 990 A1 | 8/1996 |
|---|---|---|
| DE | 199 13 078 A1 | 9/2000 |
| DE | 100 16 142 A1 | 4/2002 |
| DE | 100 62 427 A1 | 7/2002 |
| DE | 102 44 732 A1 | 4/2004 |

(Continued)

*Primary Examiner*—Benjamin C Lee
*Assistant Examiner*—Jennifer Mehmood
(74) *Attorney, Agent, or Firm*—Laurence A. Greenberg; Werner H. Stemer; Ralph E. Locher

(57) ABSTRACT

The device includes a first and a second structural parameter for a first or a second hollow body. At least one of the parameters changes along the collision location detection region in such a way that the quotient and/or the difference between the two signals of the sensors essentially continuously increases or decreases when the same object collides at the same speed in different collision locations. Suitable parameters are, for example, the cross-sectional surface of a hollow body or the rigidity thereof.

22 Claims, 7 Drawing Sheets

FOREIGN PATENT DOCUMENTS

| | | |
|---|---|---|
| DE | 103 26 770 A1 | 4/2004 |
| DE | 10 2004 017 270 B3 | 12/2005 |
| EP | 1 138 559 A1 | 10/2001 |
| GB | 2 374 186 A | 10/2002 |
| WO | WO 03/082639 A1 | 10/2003 |
| WO | 2005/098384 A1 | 10/2005 |

* cited by examiner

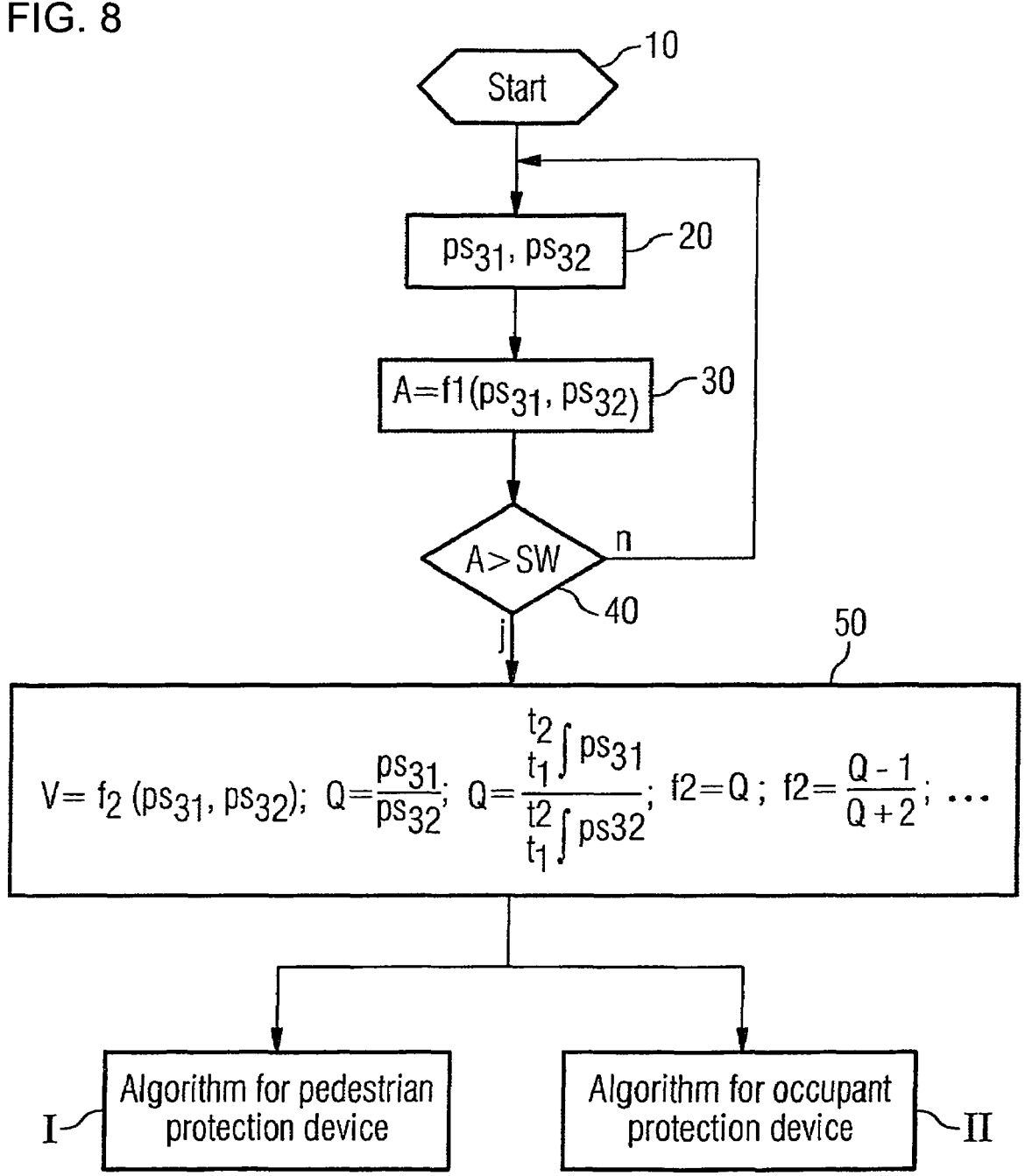

DEVICE, VEHICLE AND METHOD FOR DETECTING A COLLISION OF AN OBJECT ON A COLLISION LOCATION DETECTION REGION OF A VEHICLE

CROSS REFERENCE TO RELATED APPLICATION

This application is a national stage entry of PCT/EP05/51852 filed on Apr. 26, 2005.

Device, vehicle and method for detecting a collision of an object on a collision location detection region of a vehicle

BACKGROUND OF THE INVENTION:

Field of the Invention

The invention relates both to a device and a vehicle having a device for detecting a collision of an object on a collision location detection region of a vehicle, comprising a first and a second essentially enclosed hollow body which are connected to part of the vehicle bodywork, which are disposed with their longitudinal axis parallel to a collision location detection direction and overlapping one another in the collision location detection region, and which are disposed close to the outer surface of the vehicle in such a way that at least one of the hollow bodies is compressed during the collision. The device additionally has a first and a second sensor for detecting the compression of the associated first and second hollow body respectively, a signal indicative of the relevant compression being able to be tapped off at each sensor, and also an evaluator to which the two signals can be fed. The invention additionally relates to a corresponding method in which such a vehicle or at least one such device is used.

A device, vehicle and method of this kind are known from publication WO 09/82639 A1 which discloses a device (pg, 17, lines 4 to 13 and FIG. 6) which has overlapping hollow bodies along part of the vehicle's outer paneling which serves as a bumper. In said hollow bodies there are mounted pressure sensors which can detect an impacting object, e.g. a pedestrian, by means of the pressure increase resulting from compression of the respective hollow body and can communicate it to a processing unit (evaluator) in the form of a signal. The corresponding collision location can be determined depending on which pressure sensor transmits more or less signal to the evaluator. A pedestrian protection device, for example, is designed to be triggered depending on the collision determined and possibly also depending on the collision location determined, i.e. the rear part of the motor vehicle's engine hood can be raised so that the distance between the engine hood and the underlying engine is increased, thereby softening the impact of the pedestrian's head on the engine hood.

Such a sensing device can of course also give an early indication of an incipient severe collision and its collision location to the processing unit of an occupant protection system which then, for example, influences the triggering threshold of a vehicle collision measuring accelerometer in such a way that an occupant protection device such as an airbag or similar is deployed earlier.

For the disclosed device, the higher the accuracy required for determining the collision location, the more hollow bodies each with their own pressure sensor must be disposed in the bumper. However, this involves very high constructional cost/complexity and extensive wiring of each pressure sensor to the processing unit. Moreover, very high cost/complexity is necessary for transmitting data to the evaluator and for computing the larger number of individual signals from the pressure sensors in the evaluator.

SUMMARY OF THE INVENTION:

The object of the present invention is to create as simple a means as possible of detecting an impact on a vehicle and the associated collision location on the vehicle bodywork and to make the information thereby obtained available to a pedestrian protection system or an occupant restraint system.

This object is achieved by a device as claimed in claim 1.

The inventive device for detecting a collision of an object on a collision location detection region of a vehicle along a collision location detection direction has a first and a second essentially enclosed hollow body connected to part of the vehicle bodywork and which are disposed with their longitudinal axis parallel to a collision location detection direction and in an overlapping manner in the collision region.

The collision location detection region can be, for example, at least part of a front and/or rear bumper and/or a side door of the vehicle. A typical collision location detection direction is then, for example, the longitudinal direction of the front and/or rear bumper and/or the direction along the outer surface of a side door.

To detect the compression of the two hollow bodies, there are disposed in each hollow body a sensor such as a pressure sensor for detecting the adiabatic pressure increase associated with the compression. However, such pressure sensors can if necessary also be disposed away from the hollow bodies, but connected thereto, e.g. via a pressure port. Instead of pressure sensors, any other types of sensors can also be used, such as temperature sensors, sensors with strain gauges, etc. which provide a signal indicative of the compression of the associated hollow body and which can be fed to an evaluation processor of the device.

In this context, essentially enclosed means that, at least during the very brief period of a collision on a vehicle, the inventive hollow bodies allow no pressure equalization with the ambient pressure which would affect to an undesirably large extent the signal amplitudes of the compression detecting sensors.

According to the invention, the device has a first constructional parameter assigned to the first hollow body and at least one second constructional parameter assigned to the second hollow body, at least one of the parameters varying along the collision location detection direction in such a way that the quotient and/or the difference of the two sensor signals essentially increases or decreases continuously in the event of a collision of the same object with identical velocity at different collision locations along the collision location detection direction.

The invention is based on the knowledge that a hollow body can be constructionally embodied along its longitudinal axis in the collision location detection direction, or disposed inside the vehicle, in such a way that the same object colliding with identical velocity produces different pressure signals depending on the collision location in the collision location detection region along the collision location detection direction. In this context reference should be made to the hitherto unpublished German patent application 10,2004,017,270 of the Applicant, the content of which shall be deemed to be published herewith.

Consequently, the collision location along the collision location detection direction could be relatively accurately determined, at least for an always identical colliding object at the same collision velocity, solely by means of a changed shape of a hollow body used along the collision location detection direction. However, since in real collision situations in the majority of cases widely differing objects, e.g. pedestrians, moving or non-moving vehicles, stationary collision objects such as trees, walls, etc., with very different impact velocities predominate, a collision location can only be very imprecisely determined in this way, as it is impossible to discriminate whether a signal amplitude is caused by a particular collision location or by a particularly large or small kinetic energy of the colliding object.

However, if a second hollow body is used along the same collision location detection direction, preferably a hollow body with identical volume which in turn preferably even has the same length, by taking the ratio of the signals indicative of the compression of the two hollow bodies, this unwanted effect of the absolute values of the two individual signals can be avoided. The more the two hollow bodies are geometrically alike, the more closely to one another they are disposed and the more the mounting location of the two hollow bodies overlaps in the collision location detection direction, the more comparable are the respective sensor signals for the two hollow bodies, and therefore the greater the validity of the ratio of the two sensor signals in respect of the collision location in question.

Other advantageous developments of the device according to the invention are set forth in the subclaims.

The variable parameter in the collision location detection direction is preferably the cross-sectional surface area of a hollow body along the collision location detection direction. For example, the cross-sectional surface area of the first hollow body increases in the direction of the collision location detection direction, while the comparable cross-sectional surface area of the second hollow body remains the same or decreases in the same direction. The larger the cross-sectional surface area perpendicular to the collision location detection direction, the greater usually also the pressure increase when the associated hollow body is compressed in proximity to said large cross-sectional surface area by a colliding object. For a small cross-sectional surface area, the reverse applies. Consequently if at least one of the cross-sectional surface areas varies along the collision location detection direction or even preferably the two cross-sectional surface areas vary inversely to one another, the quotient of the signals of the sensors for different collision locations ideally exhibits a different value in each case.

A different cross-sectional surface area of at least one of the hollow bodies along the collision location detection direction is a very simple constructional measure here: for example, the hollow bodies can be injection molded plastic parts. Such plastic parts can be manufactured simply and inexpensively in virtually any shapes.

As the unwanted effect of the absolute signals of the sensors for local resolution is eliminated by taking the ratio, relatively inexpensive absolute value sensors could be advantageously used, e.g. absolute pressure sensors. A further advantage, moreover, is that in addition to locating the collision the entire absolute sensor signal caused by the collision can nevertheless continue to be evaluated, e.g. by taking the sum of the two individual signals. In addition, for example, the absolute signal of one sensor can also be compared with the absolute signal of the other sensor in order to check the plausibility of the two sensor signals. In this way, one sensor can therefore be used as a safing sensor for the other sensor.

In a further advantageous embodiment of the invention, one parameter of a hollow body is the stiffness of the housing of said hollow body. The stiffness of the housing is primarily determined by the shape and material properties of the housing of a hollow body. The stiffness of the housing of a hollow body determines the force which must be applied to the housing of the hollow body to deform it. Consequently, the stiffness is critical for the compression of the hollow body. If the stiffness of the housing varies in the collision location detection direction, a higher signal increase for collision locations in proximity to points of low stiffness is to be expected. If the same parameter of the adjacent hollow body remains unchanged or varies inversely thereto, by taking the ratio of the signals of the two sensors the location of the collision of an object in the collision location detection direction is easily ascertainable.

An alternative embodiment for a subject matter according to the invention with which the object is likewise achieved is set forth in claim 11.

The vehicle according to the invention specified there features a device according to the preamble of claim 1, wherein the device does not necessarily have a variable parameter in the collision location detection direction; in fact the vehicle has a variable parameter in the collision location detection direction which is additionally assigned to such a device if necessary. Such a vehicle parameter is generally a vehicle bodywork parameter, as will be explained below.

In an advantageous embodiment of a vehicle according to the invention, the stiffness of part of the vehicle bodywork varies in the collision region along the collision location detection direction. If, for example, the hollow body is disposed in a bumper, the deformability of the hollow body is considerably affected by the stiffness of the vehicle bodywork in the collision region: the stiffer the vehicle bodywork, the more difficult it is to deform the hollow body disposed therein. If the stiffness of the vehicle bodywork in the collision location detection direction varies, this changes the force which must be applied to deform the hollow body disposed in the accommodating body.

The possibility of using absolute value sensors, particularly absolute pressure sensors, and the associated advantages exist equally for the inventive device and a vehicle according to the invention.

Further advantageous embodiments of the device and vehicle according to the invention are set forth in the subclaims.

One possibility for varying the stiffness of a housing of a hollow body or the stiffness of a vehicle bodywork section in the collision region in the collision location detection direction is, for example, a varying wall thickness of the housing or of the bodywork section. Particularly in the case of a housing or a bodywork section, such as a bumper, made of injection molded plastic, this is very easy to manufacture. Alternatively, struts or stiffeners can be selectively provided on the housing or bodywork section, preferably in one piece therewith. The latter can also be particularly easily implemented in the case of an injection molded plastic housing. Especially with injection molded plastic parts, material admixtures can also be varied along the collision location detection direction in order to vary the stiffness of the housing of a hollow body and/or of the vehicle bodywork in the collision region. However, this generally involves comparatively high manufacturing cost/complexity.

Since two closely adjacent hollow bodies are used in one embodiment of the development of a device or vehicle according to the invention, particular care must be taken in the constructional design to ensure that, although on the one hand the force necessary for compressing one hollow body by selectively varying the stiffness of a hollow body housing or of the vehicle bodywork along the collision location detection direction shall vary, at the same time the corresponding force for compressing the second hollow body shall vary hardly at all or inversely thereto.

It should be remarked here that, with selective stiffening of the housing of a hollow body or of the vehicle bodywork in the collision region, care must always also be taken to ensure that the bodywork structure is not allowed to change in a dangerous manner in the event of a pedestrian collision: for example, many edges of the bodywork are selectively rounded off; yielding plastics are provided at many points in the vehicle bodywork in order to reduce the risk of pedestrian injury. Under no circumstances should such precautions be compromised by the design of the hollow body housing or vehicle bodywork to the detriment of pedestrian safety.

It is particularly cost effective and therefore advantageous for the hollow body to be constructed in one piece with the vehicle bodywork, e.g. in one piece with the bumper, the latter being connected, for example, not only to a hollow body or both hollow bodies, but also itself serving at least as part of a hollow body or of both hollow bodies, e.g. as part of a housing wall.

Preferably at least one of the parameters of at least one hollow body or of the vehicle bodywork must continuously increase or decrease along the collision location detection direction, whereas e.g. a second parameter of the second hollow body or of the vehicle bodywork remains the same or in turn preferably continuously increases or decreases inversely thereto, i.e. due to the continuousness of the decrease or increase of at least one of the parameters of a hollow body or of the vehicle body, ideally the two signals increase or decrease essentially continuously in the event of a collision of the same object with identical velocity on different collision locations along the collision location detection direction. Evaluating continuous signals is generally much easier than evaluating discontinuous signals. If the second parameter additionally varies inversely to the second parameter, a higher variation of the quotient and/or difference of the sensor signals along the collision location detection direction and therefore a higher local resolution of the device is achieved.

It should be pointed out at this juncture that the characterizing features of the two alternative embodiments of the invention according to the independent device claims and their advantageous developments can be used in any reasonable combination with one another. For example, the cross-section of a hollow body in the collision location detection direction and the stiffness of the same hollow body could vary simultaneously, and also the stiffness of part of the vehicle bodywork in the collision region accommodating the hollow bodies. It remains left to a person skilled in the art to select an advantageous combination of such features for a specific embodiment of a device or a vehicle according to the invention depending on the relevant requirements and constructional conditions.

The object of the present invention is further achieved by a method according to claim 14.

Advantageous developments of the method according to the invention are set forth in the subclaims.

BRIEF DESCRIPTION OF THE DRAWINGS:

Advantageous embodiments and developments of the device according to the invention will now be described with reference to the accompanying drawings in which:

FIG. 8 shows an example of the method according to the invention.

Functionally or constructionally identical elements are denoted by the same reference numerals throughout the figures.

Figure 1:
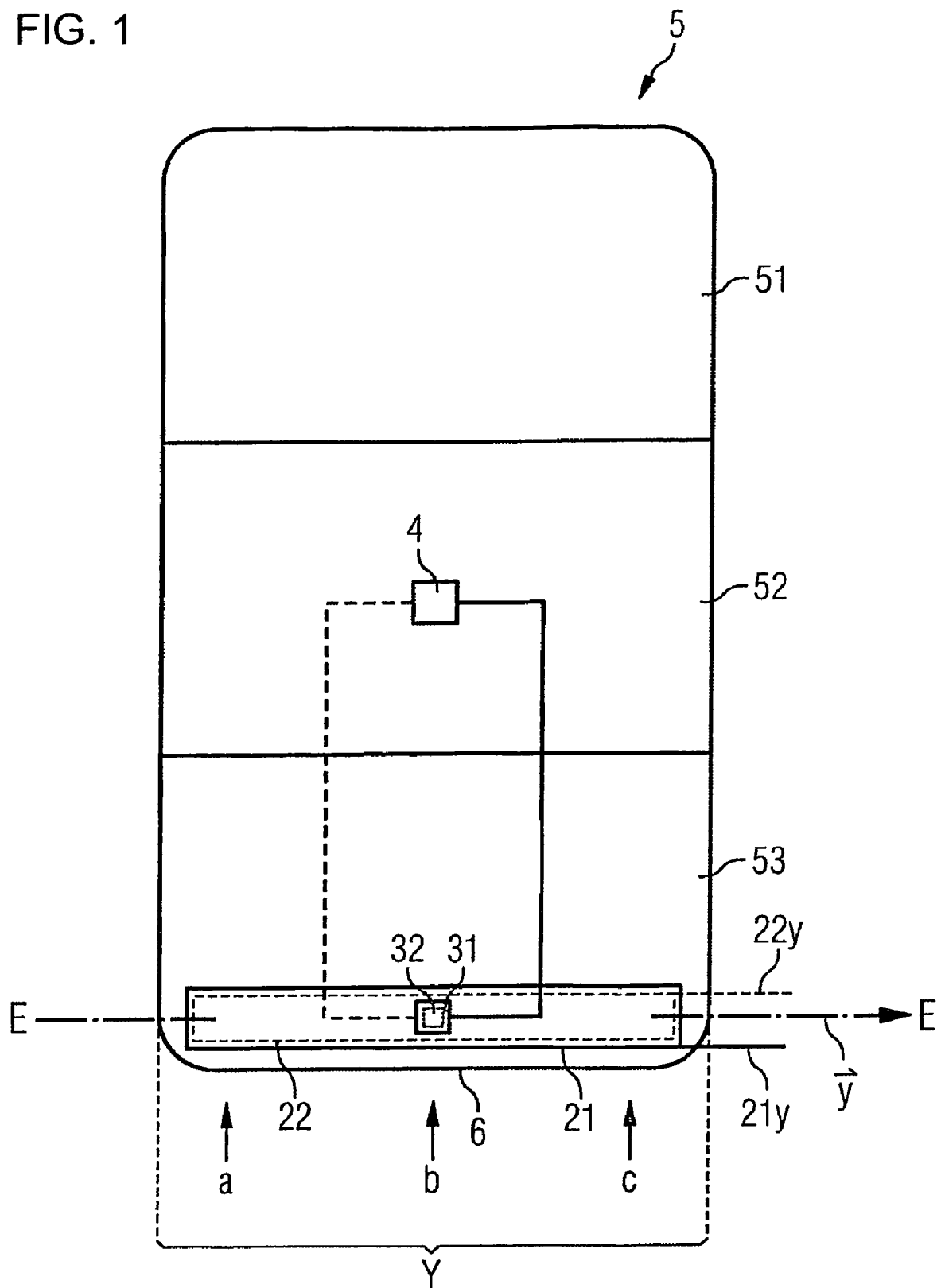
FIG. 1 shows a plan view of a motor vehicle having a front bumper and a device according to the invention comprising a first pressure sensor and a second pressure sensor inside a first hollow body denoted by a continuous line and a second hollow body denoted by a dashed line respectively.

DESCRIPTION OF THE PREFERRED EMBODIMENTS:

FIG. 1 shows a plan view of a bodywork of a motor vehicle 5 with a rear end 51, a passenger cell 52 and a front end 53. The front end area of the front bodywork 53 facing away from the passenger cell 52 forms a bumper 6 which in vehicles of more recent design mainly consists of easily deformable plastic parts which contribute to the external styling of the vehicle. The bumper 6 curves round laterally from its front-most limiting surface of the motor vehicle 5 to merge into the passenger cell. The bumper 6 here simultaneously constitutes the collision location detection region Y. Behind the bumper 6, possibly as an integral part thereof, two hollow bodies 21 and 22 are shown, the second hollow body 22 denoted by a dashed line being completely overlapped by a first hollow body 21 denoted by a continuous line in FIG. 1. Likewise denoted by a dashed and a continuous line respectively are a second pressure sensor 32 inside the second hollow body 21 and a first pressure sensor 31 inside the first hollow body 21. The collision location detection direction y runs perpendicular to the travel direction of the vehicle along the bumper 6. In their maximum extent, the two hollow bodies 21 and 22 according to the invention extend along said collision location detection direction y, their respective longitudinal axes 21y and 22y running parallel to said collision location detection direction y.

The first and second pressure sensor 31, 32 can supply signals $ps_{31}$ and $ps_{32}$ via a connecting lead denoted by a continuous and a dashed line respectively to a central control unit 4 which is disposed centrally in the motor vehicle 5 in the area of the passenger cell 52, preferably under the central console, mechanically fixed to the vehicle chassis. The control unit 4 contains signal evaluating electronics, for which reason it also serves as an evaluator, and control electronics for triggering a pedestrian protection device or an occupant protection device.

In order to define three different collision locations on the bumper 6, regions a and c on the left-hand and right-hand side respectively of the bumper 6 are shown. Midway between them is a collision region b.

In the event of compression of the hollow bodies 31 and 32, caused by a collision of an object on one of the collision regions a, b, c, the pressure sensors 31 and 32 detect the resulting pressure increase, convert it into a signal and communicate it by means of a suitable transmission protocol via the respective connecting leads to the central control unit 4 where the ratio value V of the two signals $ps_{31}$ and $ps_{32}$ to one another is computed according to a suitable formula and the activation of an occupant protection device or a pedestrian protection device is made dependent thereon.

Figure 2:
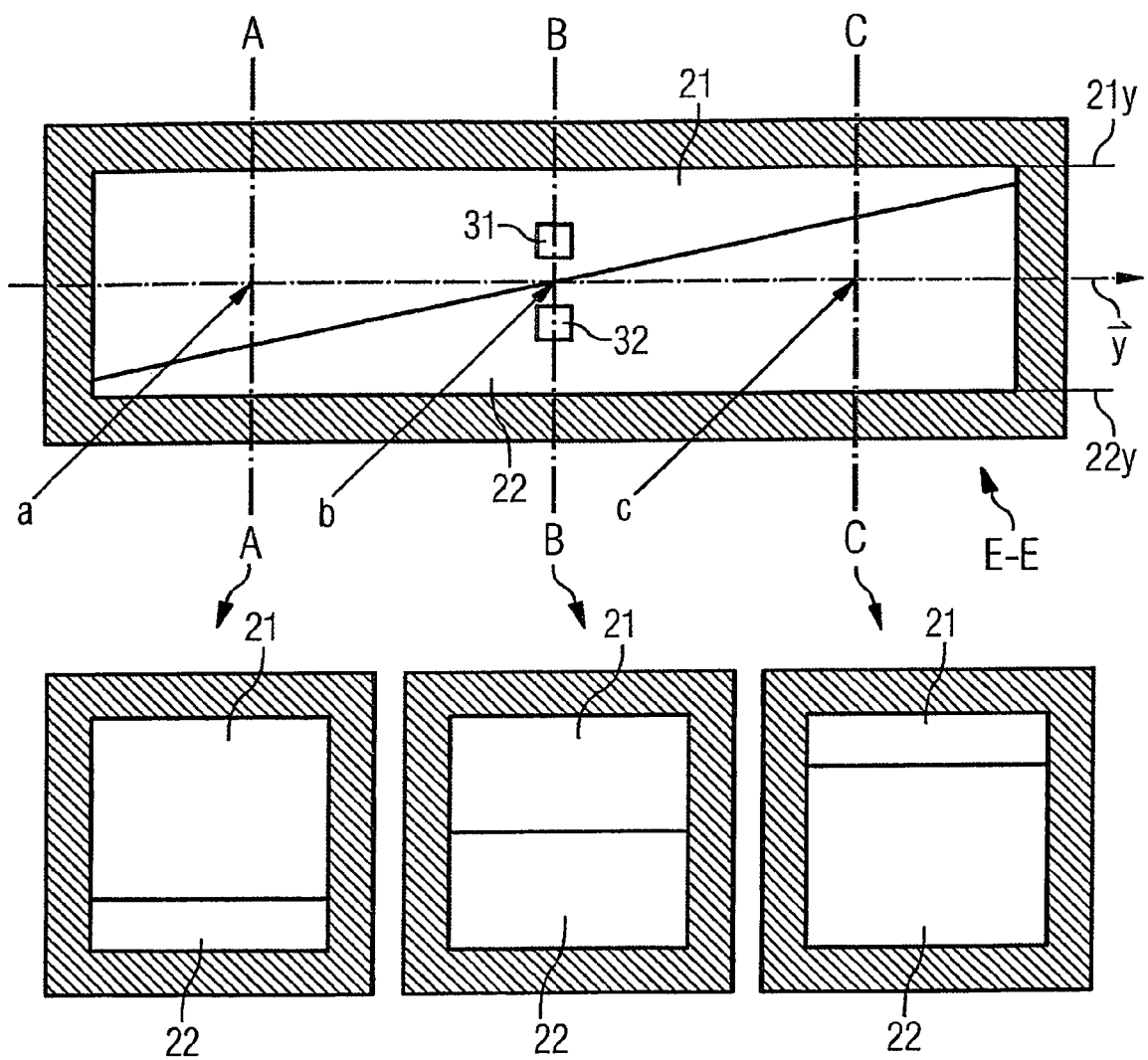
FIG. 2 shows a cross-section through the inventive device from FIG. 1 along the intersecting line E-E, FIG. 3 schematically illustrates the signal waveforms, plotted against time, of the two pressure sensors for different collision locations for a device according to the invention, FIG. 4 schematically illustrates the characteristic of the ratio of the signals of the two sensors plotted against the collision location detection direction.

The collision location detection direction y coincides with an intersecting line E-E. A section through the hollow bodies 21, 22 is shown in FIG. 2. The two hollow bodies 21 and 22 are disposed adjacent to one another and together form an oblong cuboid which has its longest spatial extent along the collision location detection direction y. A common partition passes through the cuboid along its entire length at an acute angle to the collision location detection direction, thereby dividing the two hollow bodies 21 and 22 from one another as separate measured volumes.

The first hollow body 21 therefore forms a three-dimensional trapezoid with a maximum cross-sectional surface area at one end and a minimum cross-sectional surface area at the other end. The second hollow body 22 likewise forms a trapezoid with a maximum and a minimum cross-sectional surface area on opposite ends compared to the cross-sectional surface areas of the first hollow body 21. The lower part of FIG. 2 shows three sections along a first, second and third intersecting line A-A, B-B, C-C along the two hollow bodies 21 and 22, the cross-sectional surface areas being perpendicular to the collision location detection direction.

Figure 3:
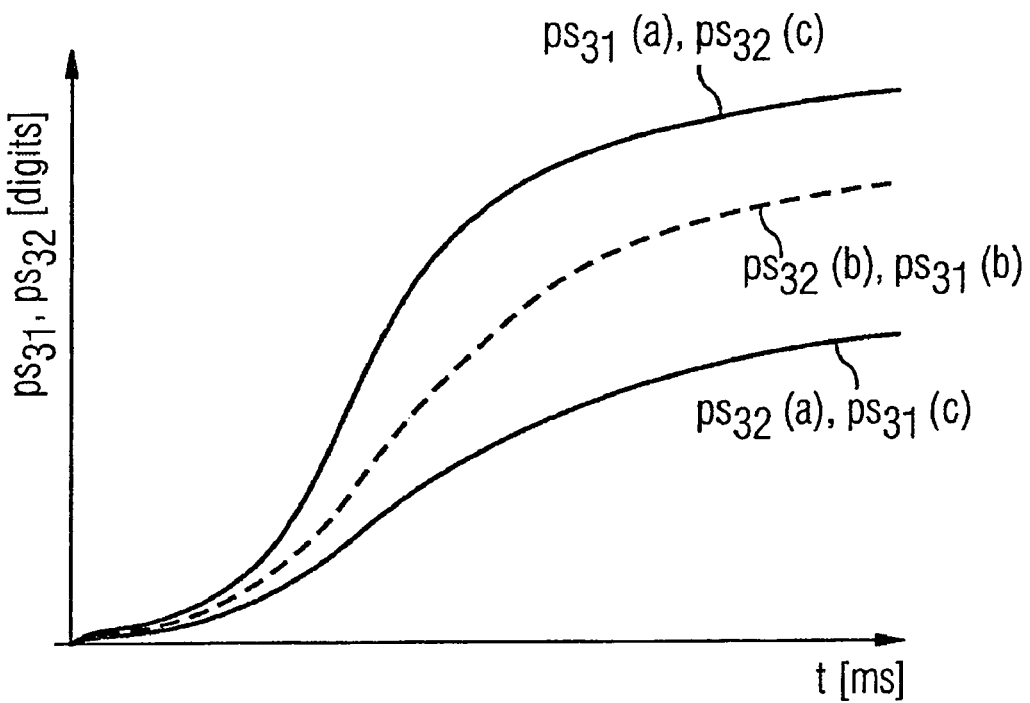

FIG. 3 shows the respective basic waveforms of the signals $ps_{31}$ and $ps_{32}$ of the pressure sensors 31 and 32 for collisions on the collision regions a, b, c of FIGS. 1 and 2. The signals are plotted in arbitrary units (digits) against time t in ms. From a starting time t=0, the signals $ps_{31}$ and $ps_{32}$ of the two pressure sensors 31, 32 initially rise with a slight gradient irrespective of the collision location a, b, c. The gradient steepens over time t until all the signal characteristics shown flatten out again. However, the maximum gradient and maximum signal amplitude in the time period shown is mainly very different for each of the two sensors 31 and 32 and depending on the collision location a, b, c: for a collision location a, the first measured volume 21 has its largest cross-sectional surface area (along the intersecting line A-A) and the signal $ps_{31}$ (a) consequently attains both its maximum gradient and its maximum signal amplitude in the event of a collision at that point. For a collision location c, in proximity to which the cross-sectional surface area (along the intersecting line C-C) of the first hollow body 21 is at its smallest, both the gradient and the signal amplitude of the associated signal $ps_{31}$ (c) are lower at each collision instant t. Conversely, the gradient of the signal $ps_{32}$ (c) of the second sensor 32 in the second hollow body 32 attains both its steepest gradient and the highest signal amplitudes for a collision location c, whereas the signal $ps_{32}$ (a) of the same sensor 32 exhibits the lowest gradient and amplitude values for a collision location a at which the hollow body 22 has a comparatively smaller cross-sectional surface area. For a collision location b midway between the respective ends of the two hollow bodies 21 and 22 in the collision location detection direction, the two signals $ps_{32}$ (b) and $ps_{31}$ (b), in the ideal case illustrated here, have virtually identical signal amplitudes and gradients, as the two cross-sectional surface areas of the two hollow bodies 21 and 22 are equal at that point in the ideal case shown.

Figure 4:
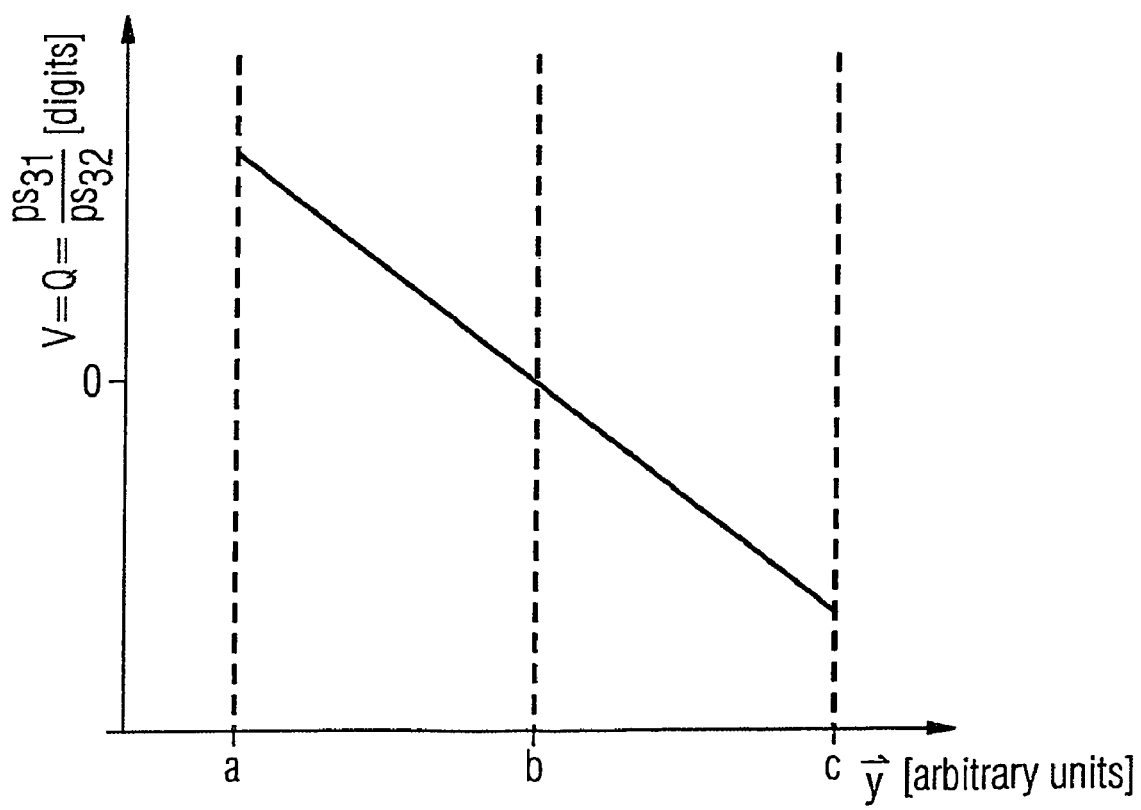

FIG. 4 schematically illustrates a possible computation formula for a ratio value V of the signals $ps_{31}$, $ps_{32}$ of the two sensors 31 and 32 plotted against the collision location detection direction y. It is formed here simply by the quotient Q of the signal $ps_{31}$ of the first pressure sensor 31 and the second signal $ps_{32}$ of the second pressure sensor 32. According to the schematic signal waveforms of FIG. 3, the quotient Q exhibits a maximum value at a collision location a and decreases linearly until it reaches a minimum value at the collision location c. In the example shown, the relationship between the quotient Q of the signals $ps_{31}$, $ps_{32}$ of the two pressure sensors 31, 32 is consequently not only constant but linear and therefore particularly easy to evaluate. However, instead of the plotted quotient Q, other computation formulas could also be used for the ratio V, examples of which are shown in the flowchart of an example of a method according to the invention in FIG. 6.

Figure 5:
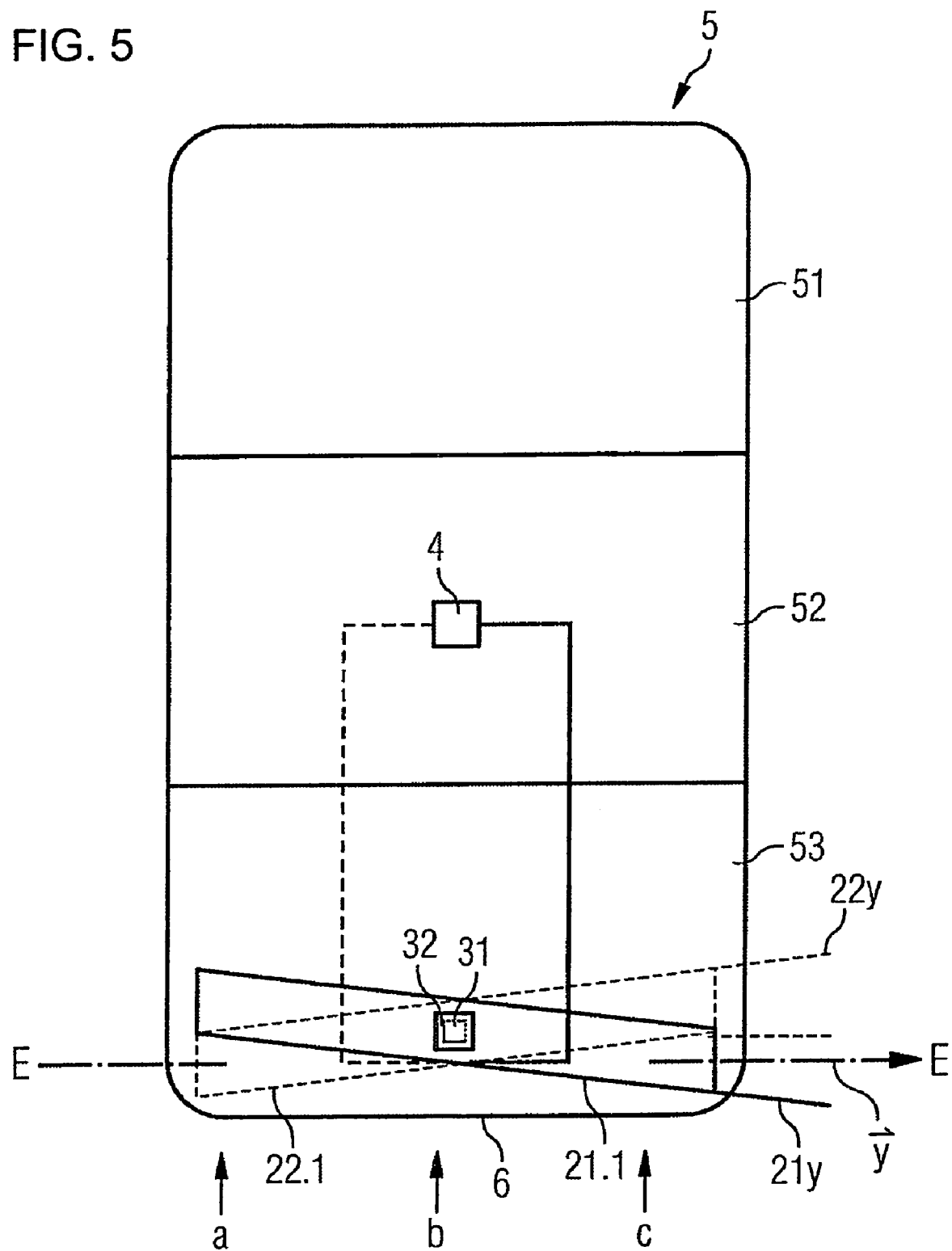
FIG. 5 is a cross-sectional view as in FIG. 1 with an alternative embodiment for hollow bodies according to the invention.

FIG. 5 shows another example of a device according to the invention. It depicts a cross-section through a motor vehicle 5 already shown in FIG. 1 in plan view. As in FIG. 1, the section shown runs through a first hollow body 21.1 drawn with a continuous line. Therebelow relative to the section shown is the second hollow body 22.1 drawn with a dashed line. In contrast to FIG. 1, the two hollow bodies 21.1 and 22.1 are disposed at an angle to the plane of cross-section. Unlike the hollow bodies 21 and 22 in FIGS. 1 and 2, the two hollow body 21.1 and 22.1 are not trapezoidal, but each possess identical cross-sectional surface areas along the collision location detection direction y.

The inventive first parameter of the first hollow body 21.1 and the inventive second parameter of the second hollow body 22.1 are here constituted in each case by the distance to the outer surface of the bumper 6. The two parameters vary along the collision location detection direction, i.e. their respective distance from the outer surface of the bumper 6 varies along the collision location detection direction y. At a collision location a, the hollow body 21.1 is on average farther from the bumper 6. Therefore more force must be applied there until the first hollow body 21.1 also deforms in proximity to said collision location a. At a collision location c, on the other hand, the first hollow body 21.1 is on average less far away than at the collision location a. A colliding object needs to exert less force on the vehicle at that point before the first measured volume 21.1 deforms in the vicinity of the collision location c. Accordingly, for an identical colliding object with identical velocity, the signals $ps_{31}$ of the pressure sensor 31 in the hollow body 21.1 are larger for a collision location c than for a collision location a. The converse applies to the second hollow body 21.1: the associated second sensor 32 produces smaller signals $ps_{32}$(c) for a collision location c and larger signals $ps_{32}$(a) for a collision location a.

By taking the ratio of the two signals $ps_{31}$ and $ps_{32}$ the central control unit 4 connected to the two sensors 31 and 32 can in turn derive information concerning the collision location on the bumper 6. However, in the example shown, it is of course not necessary for both hollow bodies 21.1, 22.1 to be disposed at an angle to the collision location detection direction y. The critical factor is again merely that at least one constructional parameter varies along the collision location detection direction. For example, for an embodiment according to the invention it would suffice for only one hollow body 21.1 or 22.1 to be disposed at an angle. Further advantageous embodiments can be derived from any reasonable combinations of other features specified above.

Figure 6:
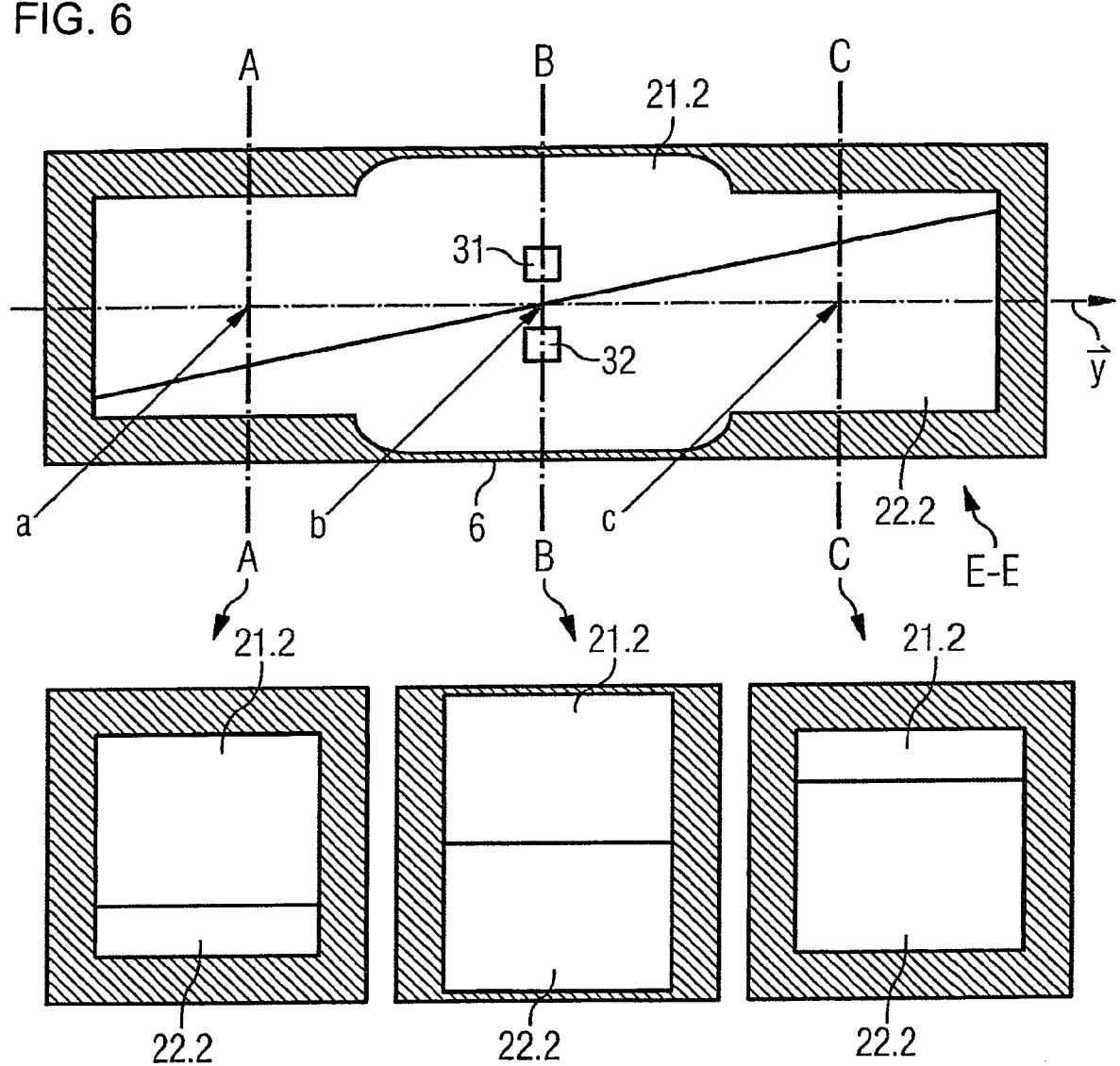
FIGS. 6 and 7 show schematic cross-sectional views of advantageous further embodiments of hollow bodies according to the invention along the intersecting line E-E from FIG. 1

FIG. 6 shows a development of hollow bodies according to the invention in the same cross-sectional representation as in FIG. 2. In contrast to FIG. 2, the two hollow bodies 21.2 and 22.2 have convexities around the central area between their two ends in the longitudinal direction which considerably enlarge the associated cross-sectional surface areas of the two hollow bodies 21.2 and 22.2 in this longitudinal section. Such a selective enlargement of the two hollow bodies 21.2 and 22.2 may be advisable especially if the surrounding bumper 6 exhibits particularly high stiffness in the area around the cross-sectional enlargement of the two hollow bodies 21.2 and 22.2, e.g. due to a mounting support for the vehicle license plate or similar. In spite of this additional stiffening, the enlargement of the two cross-sections of the two hollow bodies 21.2 and 22.2 has the effect of nevertheless producing a signal of the same size at the two pressure sensors 31 and 32 for the same force exerted by a colliding object as without said stiffening and without increased cross-sectional surface areas. In the ideal case, the illustrated selected enlargement of the two cross-sectional surface areas of the hollow bodies 21.2 and 22.2 can help to ensure that that a quotient Q also continues to be plotted against the collision location y of an object according to FIG. 4.

Figure 7:
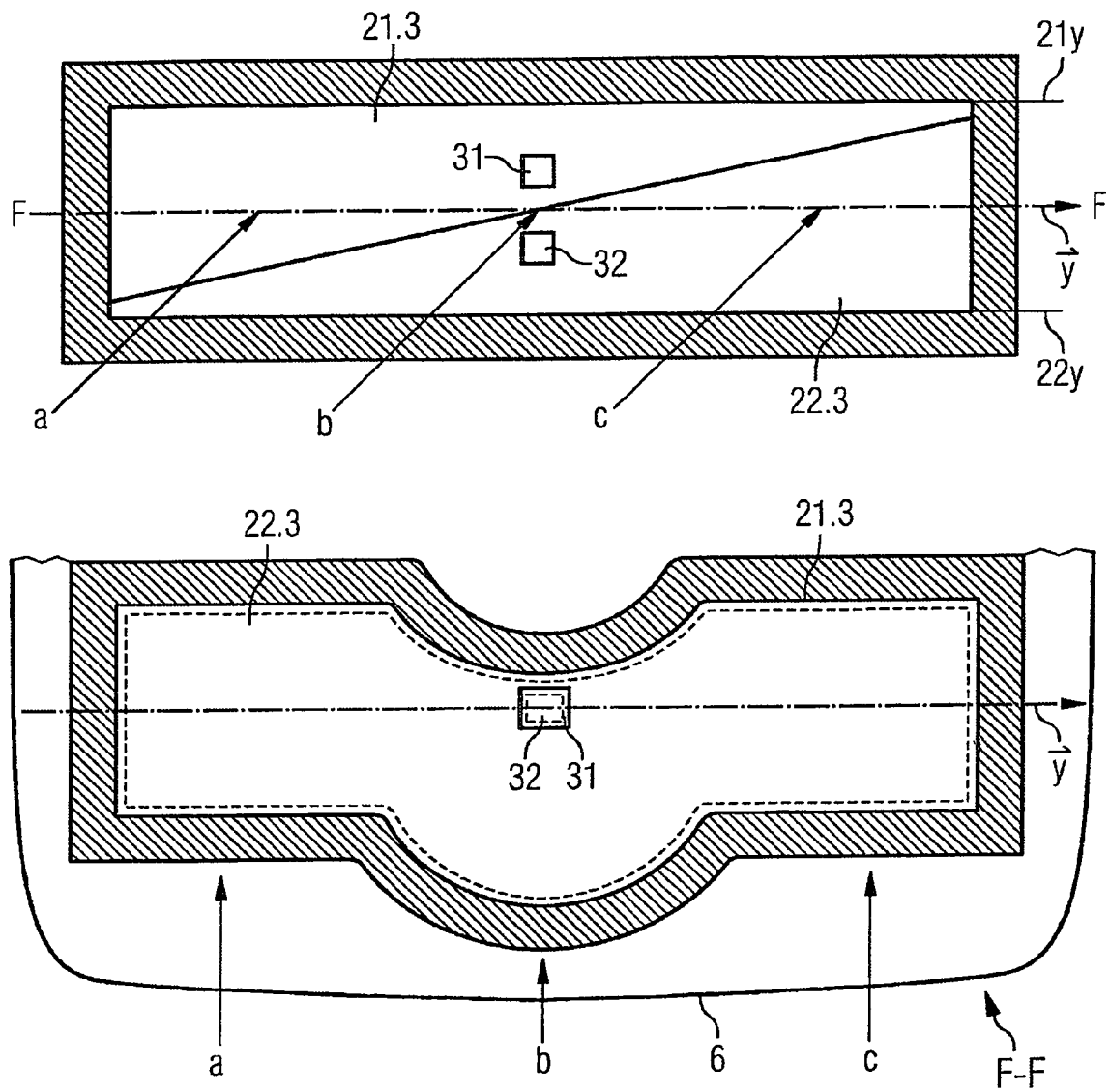

FIG. 7 shows another advantageous development of the inventive hollow bodies 21, 22 shown in FIGS. 1 and 2. As for FIG. 6, it is assumed for FIG. 7 that there exists a vehicle bodywork stiffener near the collision location b.

In the embodiment shown, the two hollow bodies 21.3 and 22.3, have the shapes known from FIG. 2 in the sectional plane along the intersecting line E-E. However, in the sectional plane along the intersecting line F-F they have a bulge in the direction of the collision location b. This bulge reduces the force to be applied to the vehicle bodywork at the collision location b in order to obtain a desired compression of the two hollow bodies 21.3 and 2, as the distance between the outer surface of the bumper 6 and the hollow bodies 21.3, 22.3 to be deformed is lower at this point and therefore less intermediate material must be forced between the bumper 6 and the two hollow bodies 21.3 and 22.3 in order to deform the two hollow bodies 21.3 and 22.3.

FIG. 8 shows a schematic flowchart for a method according to the invention. In a first step 10, e.g. after connecting the device according to the invention to a voltage supply (not shown), and after a brief runup time, the signals $ps_{31}$, $ps_{32}$ of the two pressure sensors 31 and 32 are recorded by the central control unit 4 in a second step 20. There, in a further step 30, a value A is obtained from a functional relationship $f_1$ ($ps_{31}$, $ps_{32}$), e.g. from a sum of the two signals $ps_{31}$, $ps_{32}$, from an integral or sums of integrals of the two signals $ps_{31}$, $ps_{31}$ over a defined period of time, etc., which value is compared in a further step 40 with a threshold value SW stored in a memory device of the central control unit 4.

If the value A does not exceed the threshold value SW, the sequence is terminated there, further signals $ps_{31}$, $ps_{32}$ are recorded according to step 20 and computation according to step 30 is recommenced. However, if the value A does exceed the threshold value SW, a ratio V is obtained from the functional relationship $f_2$ ($ps_{31}$, $ps_{32}$) in step 50. The functional relationship $f_2$ can be described by different formulas, e.g. according to the formulas shown in FIG. 8.

Then the value V, which is functionally related to the collision location, is fed either to a first evaluating routine I to compute the triggering decision for a pedestrian protection device and to another computation section II to compute the triggering of a more suitable occupant protection device. Depending on the results in the two computation sections I and II, triggering of a pedestrian protection device and/or an occupant protection device is initiated by the central control unit.

I claim

1. A device for detecting a collision with an object on a collision location detection region of a vehicle, comprising:
   first and second substantially closed hollow bodies, said hollow bodies:
   being connected to a part of a vehicle bodywork;
   having a longitudinal axis disposed parallel to the collision location detection direction and overlapping one another in the collision location detection region; and
   being disposed in a vicinity to an exterior surface of the vehicle such that at least one of said hollow bodies is compressed during the collision;
   a first sensor and a second sensor disposed to detect a compression of a respectively associated said first and second hollow bodies respectively, and configured to output first and second signals, respectively, indicative of the respective compression; and
   an evaluator connected to receive the signal from each sensor;
   said first hollow body having at least one first constructional parameter associated therewith and said second hollow body having at least one second constructional parameter associated therewith, with at least one of said constructional parameters varying along the collision location detection direction so that a quotient of the first and second signals increases or decreases in an event of a collision of a given object with identical velocity at different collision locations along the collision location detection direction.

2. The device according to claim 1, wherein at least one of the first parameter and the second parameter is a cross-sectional surface area of the first and second hollow body, respectively, perpendicular to the longitudinal axis of the respective hollow body.

3. The device according to claim 1, wherein at least one of the first parameter and the second parameter is a stiffness of the first and the second hollow body, respectively, along the collision location detection direction.

4. The device according to claim 1, wherein at least one of the first and second constructional parameters increases or decreases continuously along the collision location detection direction.

5. The device according to claim 1, wherein said first and second hollow bodies are formed to have one of a substantially equal volume a substantially equal length along the collision location detection direction.

6. The device according to claim 1, wherein at least one of said sensors is a pressure sensor.

7. The device according to claim 6, wherein said pressure sensor is an absolute pressure sensor.

8. A vehicle having a vehicle body and a device for detecting a collision of an object on a collision location detection region on the vehicle body, the combination comprising:
   first and second substantially closed hollow bodies, said hollow bodies:
   being connected to a part of a vehicle bodywork;
   having a longitudinal axis disposed parallel to the collision location detection direction and overlapping one another in the collision location detection region; and
   being disposed in a vicinity to an exterior surface of the vehicle such that at least one of said hollow bodies is compressed during the collision;
   a first sensor disposed to detect a compression of said first hollow body and configured to output a first signals indicative of the compression of said first hollow body, and a second sensor disposed to detect a compression of said second hollow body and configured to output a second signal indicative of the compression of said second hollow body; and
   an evaluator connected to receive the signal from each sensor;
   said first hollow body having at least one first constructional parameter associated therewith and said second hollow body having at least one second constructional parameter associated therewith, with at least one of said constructional parameters varying along the collision location detection direction so that a quotient of the first and second signals increases or decreases in an event of a collision of a given object with identical velocity at different collision locations along the collision location detection direction.

9. The vehicle according to claim 8, wherein at least one of the first parameter and the second parameters is a stiffness of the part of the vehicle bodywork in the collision location detection region.

10. The vehicle according to claim 8, wherein at least one of the first parameter and the second parameter is a distance of one of the first hollow body the second hollow body from the outer surface of the part of the vehicle bodywork in the collision region.

11. The vehicle according to claim 8, wherein a part of the vehicle bodywork in the collision region connected to the first and second hollow bodies is configured as a bumper.

12. The vehicle according to claim 8, wherein the part of the vehicle bodywork connected to said first and second hollow bodies is integrally formed in one piece with a housing of at least one of said first and second hollow bodies.

13. The vehicle according to claim 8, wherein at least one of the first and second constructional parameters increases or decreases continuously along the collision location detection direction.

14. The vehicle according to claim 8, wherein said first and second hollow bodies are formed to have one of a substantially equal volume a substantially equal length along the collision location detection direction.

15. The vehicle according to claim 8, wherein at least one of said sensors is a pressure sensor.

16. The vehicle according to claim 15, wherein said pressure sensor is an absolute pressure sensor.

17. A method for detecting a collision of an object on a collision location detection region of a vehicle, the method which comprises:
   providing a device according to claim 1;
   in an event of a collision, using the first sensor and the second sensor to detect a compression of the respectively associated first hollow body and second hollow body;
   transmitting first and second signals indicative of the respective compression to a central evaluator from the first sensor and from the second sensor, respectively;
   forming a ratio of the first and second signals with a central evaluator; and
   assigning a collision location to the ratio of the first and second signals by the evaluator from a functional relationship stored in the evaluator, and outputting a signal indicative of the collision location for further processing.

18. The method according to claim 17, wherein a value of the ratio is a quotient of the first and second signals of the first and second sensors or a quotient of values derived from the first and second signals of the first and second sensors.

19. A method for detecting a collision of an object on a collision location detection region of the vehicle, the method which comprises providing a device according to claim 4;
   in an event of a collision, using a first sensor and a second sensor to detect a compression of a respectively associated first hollow body and second hollow body;
   transmitting first and second signals indicative of the respective compression to a central evaluator from the first sensor and from the second sensor, respectively;
   forming a ratio of the first and second signals with a central evaluator; and
   assigning a collision location to the ratio of the first and second signals by the evaluator from a functional relationship stored in the evaluator, and outputting a signal indicative of the collision location for further processing.

20. The method according to claim 19, wherein a value of the ratio is a quotient of the first and second signals of the first and second sensors or a quotient of values derived from the first and second signals of the first and second sensors.

21. A method for detecting a collision of an object on a collision location detection region of a vehicle, the method which comprises:
   in an event of a collision, using a first sensor and a second sensor to detect a compression of a respectively associated first hollow body and second hollow body overlapping one another;
   transmitting first and second signals indicative of the respective compression to a central evaluator from the first sensor and from the second sensor, respectively;
   forming a ratio of the first and second signals with a central evaluator; and
   assigning a collision location to the ratio of the first and second signals by the evaluator from a functional relationship stored in the evaluator, and outputting a signal indicative of the collision location for further processing.

22. The method according to claim 17, wherein a value of the ratio is a quotient of the first and second signals of the first and second sensors or a quotient of values derived from the first and second signals of the first and second sensors.

* * * * *